United States Patent
London et al.

(10) Patent No.: US 7,261,514 B2
(45) Date of Patent: Aug. 28, 2007

(54) SEALING ARRANGEMENT, IN PARTICULAR FOR THE BLADE SEGMENTS OF GAS TURBINES

(75) Inventors: Richard London, Mellingen (CH); Peter Marx, Baden (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/400,793

(22) Filed: Apr. 10, 2006
(Under 37 CFR 1.47)

(65) Prior Publication Data

US 2006/0263204 A1    Nov. 23, 2006

Related U.S. Application Data

(63) Continuation of application No. 11/206,824, filed on Aug. 19, 2005, now abandoned.

(51) Int. Cl.
*F01D 11/08* (2006.01)
(52) U.S. Cl. ........................ 415/134; 415/135
(58) Field of Classification Search ............... 415/115, 415/134, 135, 136, 137, 138
See application file for complete search history.

(56) References Cited

U.S. PATENT DOCUMENTS

| | | | |
|---|---|---|---|
| 3,752,598 A | 8/1973 | Bowers et al. | |
| 3,975,114 A * | 8/1976 | Kalkbrenner | 415/136 |
| 4,537,024 A * | 8/1985 | Grosjean | 415/139 |
| 4,902,198 A * | 2/1990 | North | 415/115 |
| 5,868,398 A | 2/1999 | Maier et al. | |
| 6,261,053 B1 * | 7/2001 | Anderson et al. | 415/115 |

FOREIGN PATENT DOCUMENTS

| | | |
|---|---|---|
| EP | 0 896 128 A | 2/1999 |
| GB | 2 296 295 A | 6/1996 |

* cited by examiner

*Primary Examiner*—Igor Kershteyn
(74) *Attorney, Agent, or Firm*—Buchanan Ingersoll & Rooney PC

(57) ABSTRACT

A sealing arrangement has two bodies with two end faces which extend along a longitudinal axis, adjoin one another while forming a gap, the width of which can vary between zero and a maximum width. The gap is covered by a sealing strip which lies transversely to the gap, extends along the longitudinal axis and is mounted with clearance in two opposite grooves of a predetermined depth. In such a sealing arrangement, an increased maximum width of the gap is made possible by the sealing strip having a basic width transversely to the longitudinal axis, this basic width being less than or equal to twice the depth of the grooves, and by the sealing strip is constructed to prevent the sealing strip from slipping out of the grooves if the sum of the maximum width of the gap and the depth of the grooves is greater than or equal to the basic width of the sealing strip.

14 Claims, 5 Drawing Sheets

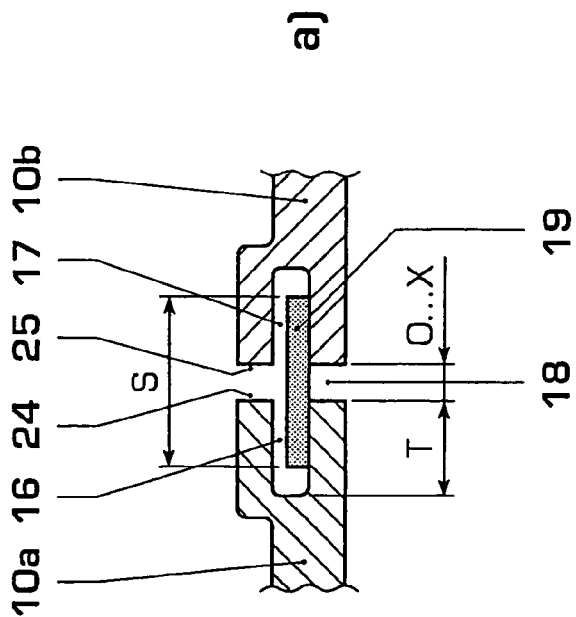
Fig. 2
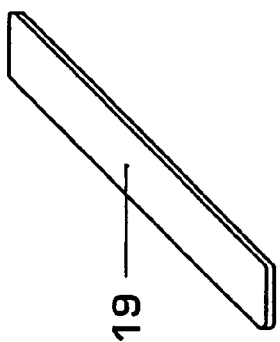
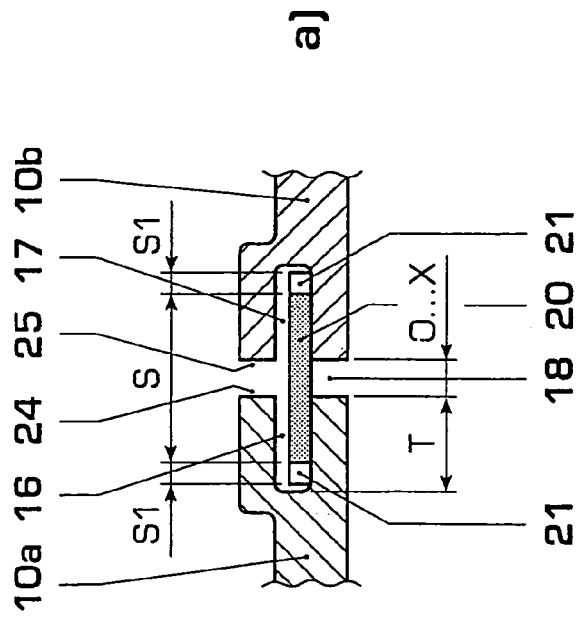
Fig. 3
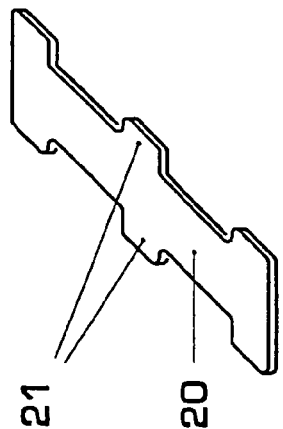

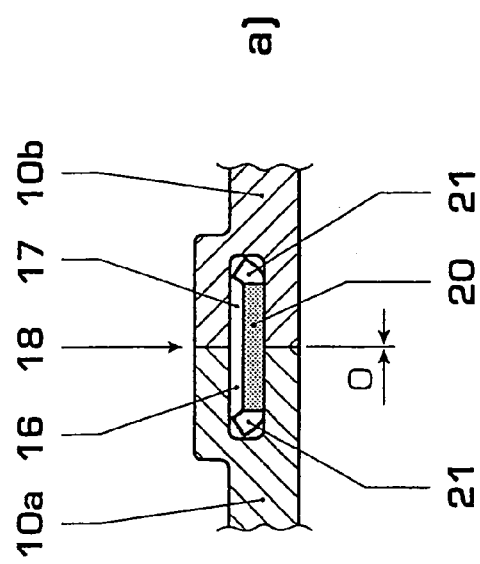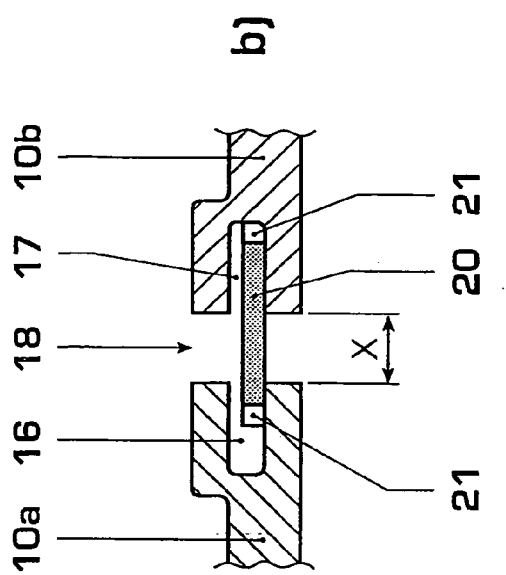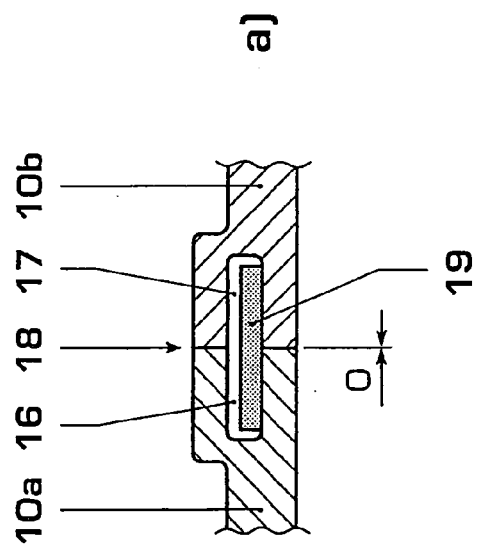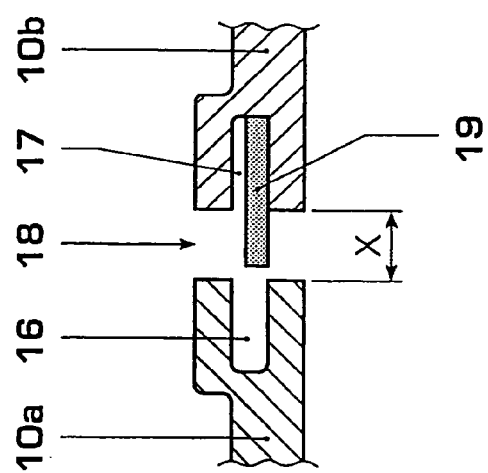
Fig. 4
Fig. 5

US 7,261,514 B2

SEALING ARRANGEMENT, IN PARTICULAR FOR THE BLADE SEGMENTS OF GAS TURBINES

The present application is a continuation application which claims priority under 35 USC. § 120 to U.S. application Ser. No. 11/206,824 filed Aug. 19, 2005, which in turn claims priority under USC. § 120 to International Application No. PCT/CH2003/000124, filed Feb. 19, 2003, the contents of which are incorporated herein by reference in their entireties.

TECHNICAL FIELD

The present invention relates to the field of thermal machines. It relates to a sealing arrangement, in particular for the blade segments of a gas turbine, according to the preamble of claim 1.

Such a sealing arrangement has been disclosed, for example, by publication EP-A2-0 896 128.

PRIOR ART

Turbine stages of gas turbines comprise rows of guide blades (stator) and moving blades (rotor). These rows are each composed of a certain number of blade segments. Such a guide blade segment is reproduced in FIG. 1 in a perspective side view. The central part of the guide blade segment 10 from FIG. 1 is the actual airfoil 11, which is defined at both ends by plate-shaped shroud segments 12, 13. The outer shroud segment 12 together with the outer shroud segments of the other blade segments of the row forms an annular outer blade shroud. The inner shroud segment 13 together with the inner shroud segments of the other blade segments of the row accordingly forms an annular inner blade shroud. Formed between the inner and outer blade shrouds is an annular passage, through which the hot working medium of the gas turbine flows. Cooling air normally flows outside the annular passage, this cooling air being separated from the hot working medium by the blade shrouds.

Provided at the end faces of the shroud segments 12, 13 are outer and inner shroud seals 14 and 15, respectively, which run in the direction of a longitudinal axis 26 and serve to seal off the intermediate spaces (gaps) between adjacent shroud segments. The cross section through such a known sealing arrangement along the plane A-A in FIG. 1 is shown in FIG. 2(a). According to FIG. 2(a), two adjacent guide blade segments 10a and 10b adjoin one another with their end faces 24, 25 in the region of the shroud segments while forming a gap 18. Arranged in the end faces 24, 25 of the guide blade segments 10a, 10b are grooves 16, 17 which run perpendicularly to the gap 18 in the direction of the longitudinal axis 26 and accommodate a sealing strip 19 (with clearance). The grooves 16, 17 can be incorporated in the segments, for example, by EDM (electrical discharge machining), grinding or milling. The rectangular, flat sealing strip 19 is reproduced in a perspective side view in FIG. 2(b).

On account of the thermal expansion during operation, the adjacent segments must be designed with a nominal clearance in the cold state in order to be able to absorb the thermal expansion. Superimposed on the nominal clearance are tolerances which result from the type of circumferential fastening of the segments. A clearance in the form of a gap 18 is obtained overall, the width of which can assume values of between 0 and a maximum width (maximum clearance) X (see FIG. 2 (a)). The nominal clearance is normally 1 . . . 3 mm, the maximum clearance (X) 3 . . . 5 mm. The grooves 16, 17 each have a depth T; the sealing strip 19 has a basic width S (see FIG. 2(a)). The depth T and basic width S must satisfy certain conditions so that the sealing strip 19 cannot fall out of the grooves (at maximum clearance X) or is not squeezed together (at clearance 0):

$$S \leq 2 \cdot T \quad (1)$$

If condition (1) is met, the sealing strip 19 is not loaded in the transverse direction even when the clearance or the width of the gap 18 is zero (see the illustration in FIG. 4(a)).

$$S - T \geq X \quad (2)$$

If condition (2) is met, the situation shown in FIG. 4(b) is avoided, in which the sealing strip 19 can fall out of the grooves 16, 17 or can tilt in the gap 18 in such a way that it is deformed or damaged during a subsequent reduction in the clearance.

A disadvantage with this type of dimensioning is that the depth T of the grooves 16, 17 and the width S of the sealing strip 19 can become very large depending on the maximum width X of the gap 18 or the maximum clearance. However, the depth T of the grooves 16, 17 and the width of the seal may be limited by the production process, the predetermined geometry or the cooling requirements of the end faces 24, 25 of the segments. In these cases, a compromise has to be found or another sealing method has to be used.

SUMMARY OF THE INVENTION

It is therefore the object of the invention to specify a sealing arrangement which can be used in particular for the blade segments of gas turbines and which avoids the disadvantages of the known sealing arrangements and is characterized in particular by the fact that a larger maximum clearance can be reliably absorbed between the adjoining bodies or segments with comparatively little effort.

This object is achieved by all the features of claim 1 in their entirety. The essence of the invention, starting from the conventional form of the sealing strip, is to provide additional means on the sealing strip which prevent the sealing strip from slipping out of the grooves if the sum of the maximum width of the gap and the depth of the grooves is greater than or equal to the basic width of the sealing strip.

A preferred configuration of the invention is characterized by the fact that the additional means comprise lugs which are arranged in a distributed manner on the longitudinal sides of the sealing strip, are defined in the direction of the longitudinal axis and locally increase the width of the sealing strip beyond the basic width by a predetermined additional width. On the one hand, the lugs, with their additional width, increase the maximum clearance which can safely be bridged by the sealing strip. On the other hand, the lugs can yield locally by bending up if transverse forces act on the sealing strip at zero clearance.

At least two lugs are preferably arranged on a longitudinal side of the sealing strip in such a way as to be distributed over the longitudinal side. In particular, the at least two lugs are arranged on the ends of the longitudinal side. This results in a stable and predetermined position of the sealing strip in the grooves at all times.

Especially favorable is a geometry in which the lugs are arranged in pairs opposite one another on the two longitudinal sides of the sealing strip.

The lugs are preferably integrally formed on the sealing strip and have the same width as the sealing strip.

In this case, the lugs may lie in the plane of the sealing strip in the initial state. However, they may also be bent out of the plane of the sealing strip in the initial state.

The sealing arrangement is especially space-saving and exerts less stress on the sealing strip if, according to another configuration, in order to accommodate the lugs, deeper pockets are formed at the corresponding locations of the grooves.

In the simplest case, the walls of the grooves may be oriented perpendicularly to the gap.

However, it is also conceivable for the walls of the grooves to be oriented obliquely relative to the gap on one side or on both sides in such a way that the grooves have a V-shaped cross-sectional profile.

Further embodiments follow from the dependent claims.

BRIEF EXPLANATION OF THE FIGURES

The invention is to be explained in more detail below with reference to exemplary embodiments in connection with the drawing, in which:

FIG. 2 shows, in two partial figures, the cross section through a known sealing arrangement in the plane A-A of FIG. 1 (partial figure (a)) and the perspective side view of the associated sealing strip (partial figure (b));

FIG. 3 shows a preferred exemplary embodiment of the sealing arrangement according to the invention in an illustration comparable with FIG. 2;

FIG. 4 shows, in an illustration comparable with FIG. 2(a), the extreme cases of the zero clearance (partial figure (a)) and of the maximum clearance (partial figure (b)) in the sealing arrangement from the prior art;

FIG. 5 shows the behavior of the sealing arrangement from FIG. 3 in an illustration comparable with FIG. 4;

WAYS OF IMPLEMENTING THE INVENTION

Figure 8:
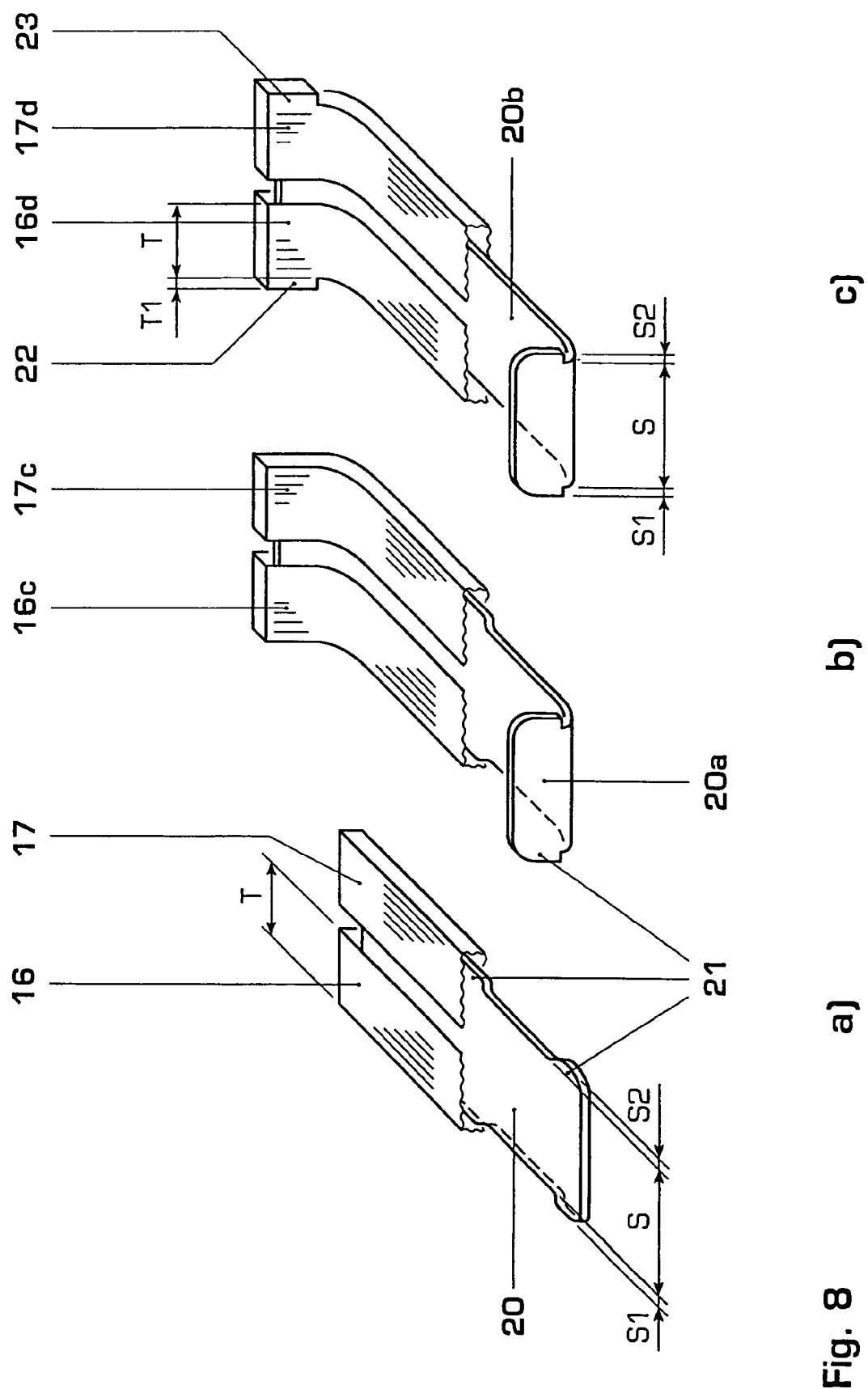
FIG. 8 shows various configurations of the grooves and sealing strips in a sealing arrangement according to the invention in three partial figures (a), (b) and (c).

A preferred exemplary embodiment of the sealing arrangement according to the invention is reproduced in FIG. 3 in an illustration comparable with FIG. 2. In this case, the same parts are provided with the same designations. The sealing strip 19 of simple rectangular shape from FIG. 2 has been replaced by a sealing strip 20 which has a plurality of integrally formed lugs 21 distributed on the longitudinal sides. As can be seen in FIG. 8(a), the lugs 21 give the sealing strip 20 a local width S1 and S2, respectively, on both sides in addition to the basic width S. In the simplest case of symmetrical lug pairs, S1=S2. Given suitable dimensioning of S1, S2, the additional width is of no importance at minimum clearance=0, since the lugs 21 are then bent over by the transverse forces and the additional width of the sealing strip 20 largely disappears (FIG. 5(a)). At maximum clearance X (FIG. 5(b)), on the other hand, the value X which can still be safely tolerated can correspondingly increase due to the additional width S1+S2=2·S1. The condition (1) mentioned at the beginning at zero clearance still applies. At maximum clearance X, on the other hand, on account of the additional width, the following condition applies:

$$S+2 \cdot S1-T \geq X \quad (3)$$

It follows directly from condition (3) that, compared with the known sealing arrangement (see condition (2)), at constant values of S and T, greater values of X can be tolerated without the sealing arrangement or the sealing strip 20 being put at risk. If the lugs 21 (at zero clearance) are first of all bent upward (or downward), the additional width of the sealing strip 20 is certainly largely lost and thus the ability to absorb a larger maximum clearance X without problems is also largely lost, but the sealing strip 20 can still be used like a conventional (standard) sealing strip of the width S.

Figure 1:
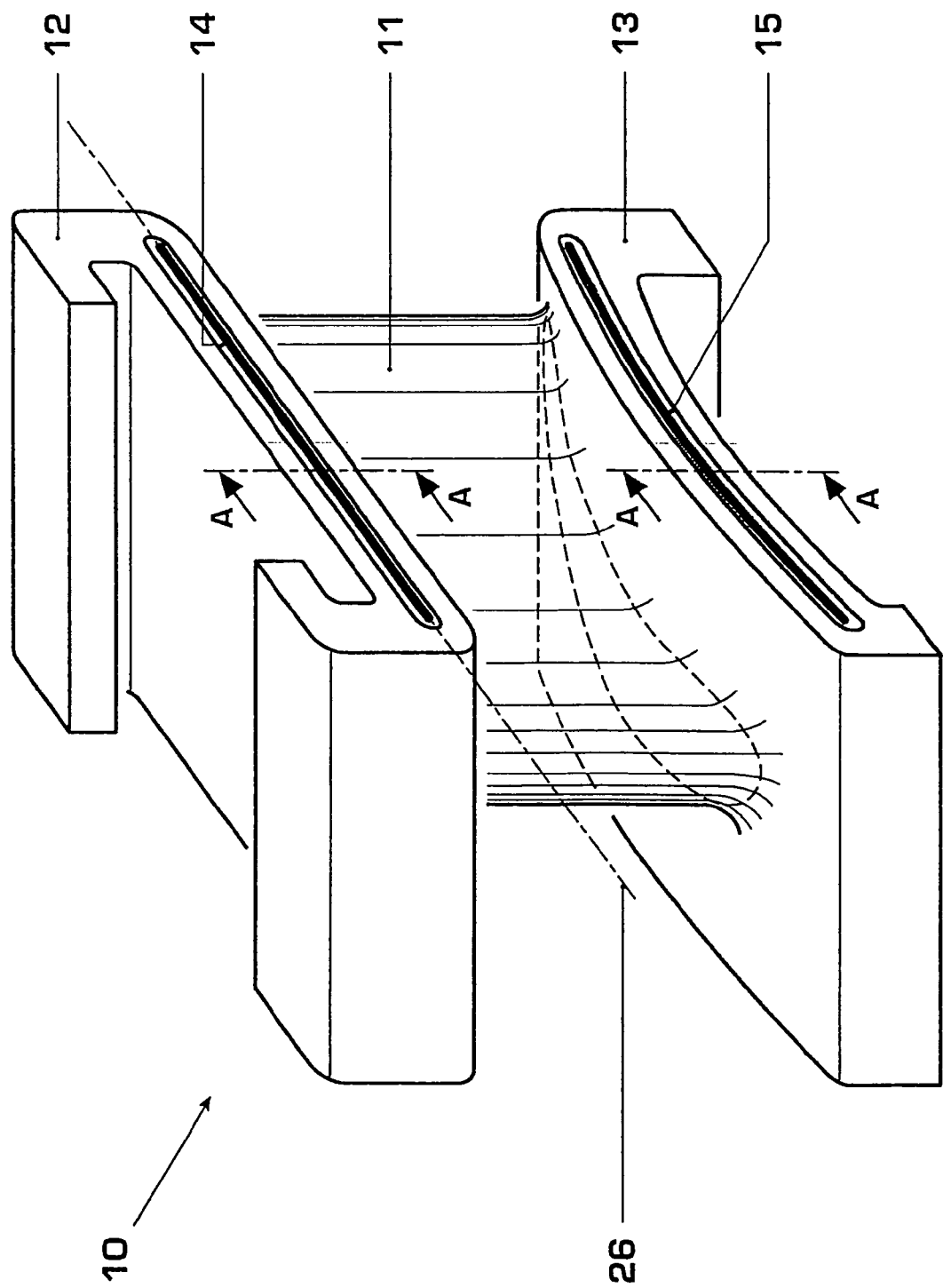
FIG. 1 shows a guide blade segment of a gas turbine according to the prior art in a perspective side view.
Figure 7:
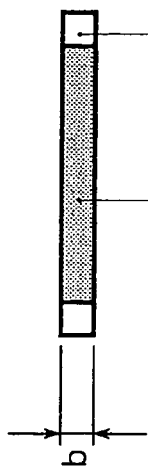
FIG. 7 shows different forms of the sealing strip for the sealing arrangement according to FIG. 3 or 6 in two partial figures (a), (b)
Figure 7:
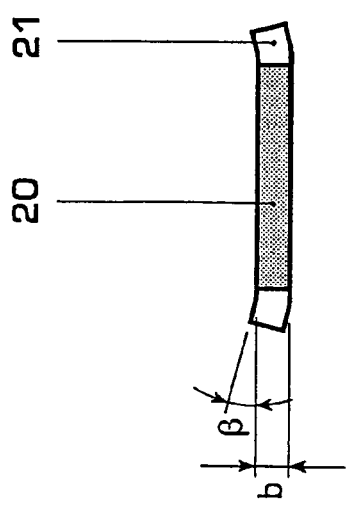

In the exemplary embodiment according to FIG. 3(b), the lugs 21 are arranged in a distributed manner on both longitudinal sides of the sealing strip 20. In this case, a respective pair of opposite lugs 21 is provided at the ends of the sealing strip 20 and a pair is provided in the center. This symmetrical distribution ensures that the enlarged width becomes effective with only a few lugs over the entire length of the sealing strip 20. However, it is also conceivable to provide more or fewer lugs or to arrange the lugs 21 only on one side of the sealing strip or in an alternating manner on both sides. Lugs 21 which are integrally formed on the sealing strip 20 and have the same thickness b as the sealing strip 20 (FIG. 7) are especially simple to produce. They can be produced by a corresponding design of the marginal contour of the sealing strip 20. However, it is also conceivable to attach the lugs 21 to the sealing strip 20 as separate elements in order to be able to optimize them independently of the sealing strip 20. It is likewise conceivable, instead of the lugs 21, to use other elements which project laterally beyond the sealing strip 20.

Figure 6:
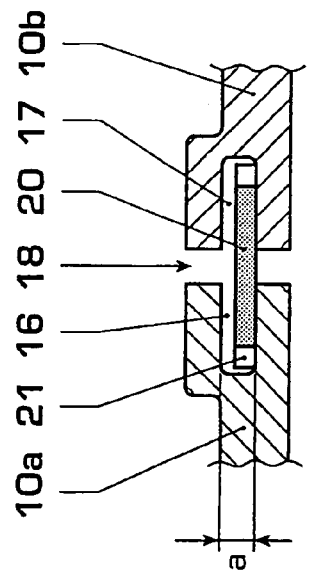
FIG. 6 shows various configurations of the grooves in a sealing arrangement according to the invention in three partial figures (a), (b) and (c)
Figure 6:
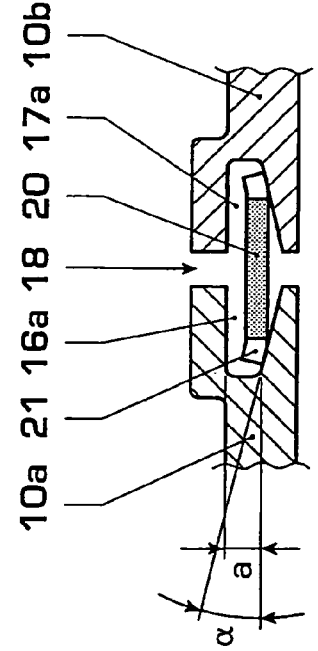
Figure 6:
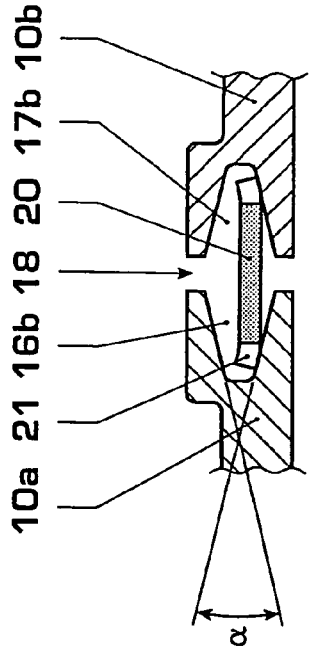

Furthermore, it is conceivable according to FIG. 7(b) to use a sealing strip 20 with lugs 21 which are already bent out of the plane of the sealing strip 20 to one side by an angle β. Such sealing strips with pre-bent lugs have the advantage that the bending process in the case of FIG. 5(a) (0 clearance) takes place in an orderly manner. However, such a pre-bent sealing strip 20 may also be advantageously used in a sealing arrangement as shown in FIGS. 6(b) and (c). In these sealing arrangements, instead of the grooves 16, 17 with walls perpendicular to the gap 18 and with the width a, grooves 16a, 17a and 16b, 17b, respectively, are provided whose walls are oriented obliquely relative to the gap 18 on one side or on both sides at an angle α in such a way that the grooves 16a, 17a and 16b, 17b, respectively, have a V-shaped cross-sectional profile. Here, the pre-bent lugs 21 result in an improved position of the sealing strip 20 in the grooves.

However, it is also conceivable, instead of the flat sealing strips 20 from FIG. 8(a), to use sealing strips 20a, 20b according to FIGS. 8(b) and (c) which are bent at the ends. To accommodate such bent sealing strips 20a, 20b, correspondingly bent grooves 16c, 17c and 16d, 17d, respectively, must be provided.

A further modification which is shown in FIG. 8(c) with reference to a sealing strip 20b bent at the ends, but may also be used in flat sealing strips, consists in providing pockets 22, 23 in the grooves 16d, 17d, these pockets 22, 23 having an additional depth T1 for accommodating the lugs 21. In this way, bending-up of the lugs 21 at 0 clearance is avoided without the increase in the maximum clearance X due to the lugs 21 being lost. However, this advantage is gained at the cost of a more complicated production of the grooves 16*d*, 17*d*.

LIST OF DESIGNATIONS

10 Guide blade segment
10*a, b* Guide blade segment
11 Airfoil
12 Outer shroud segment
13 Inner shroud segment
14 Outer shroud seal
15 Inner shroud seal
16, 17 Groove
16*a*, 17*a* Groove
16*b*, 17*b* Groove
16*c*, 17*c* Groove
16*d*, 17*d* Groove
18 Gap
19, 20 Sealing strip
20*a, b* Sealing strip
21 Lug
22, 23 Pocket
24, 25 End face
26 Longitudinal axis
a Width (groove)
b Thickness (sealing strip)
S Basic width (sealing strip)
S1, 2 Width (lugs)
T Depth (groove)
T1, 2 Depth (pockets)
X Maximum width (gap)
α, β Angle

What is claimed is:

1. A sealing arrangement two bodies, with two end faces which extend along a longitudinal axis, and adjoin one another while forming a gap, the width of which can vary between zero and a maximum width, and in which the gap is covered by a sealing strip which lies transversely to the gap, extends along the longitudinal axis and is mounted with clearance in two opposite grooves of a predetermined depth which are incorporated transversely to the gap in the end faces of the bodies, the sealing strip comprises a basic width transverse to the longitudinal axis less than or equal to twice the depth of the grooves the sealing strip further comprising lugs which are arranged in a distributed manner on the longitudinal sides of the sealing strip, are defined in the direction of the longitudinal axis and locally increase the transverse width of the sealing strip beyond the basic width by a predetermined additional transverse width which prevent the sealing strip from slipping out of the grooves if the sum of the maximum width of the gap and the depth of the grooves is greater than or equal to the basic width of the sealing strip.

2. The sealing arrangement as claimed in claim 1, wherein at least two lugs are arranged on a longitudinal side of the sealing strip in such a way as to be distributed over the longitudinal side.

3. The sealing arrangement as claimed in claim 2, wherein the at least two lugs are arranged on the ends of the longitudinal side.

4. The sealing arrangement as claimed in claim 3, wherein that at least one additional lug is arranged in the center between the at least two lugs.

5. The sealing arrangement as claimed in claim 1, wherein the lugs are arranged in pairs opposite one another on the two longitudinal sides of the sealing strip.

6. The sealing arrangement as claimed in claim 1, wherein the lugs are integrally formed on the sealing strip and have the same width as the sealing strip.

7. The sealing arrangement as claimed in claim 1, wherein the lugs lie in the plane of the sealing strip in the initial state.

8. The sealing arrangement as claimed in claim 1, wherein the tugs are bent out of the plane of the sealing strip in the initial state.

9. The sealing arrangement as claimed in claim 1, wherein in order to accommodate the lugs, deeper pockets are formed at the corresponding locations of the grooves.

10. The sealing arrangement as claimed in claim 1, wherein the walls of the grooves are oriented perpendicularly to the gap.

11. The sealing arrangement as claimed in claim 1, wherein the walls of the grooves are oriented obliquely relative to the gap on one side or on both sides in such a way that the grooves have a V-shaped cross-sectional profile.

12. The sealing arrangement as claimed in claim 1 wherein the grooves and the sealing strip are of flat design.

13. The sealing arrangement as claimed in claim 1, wherein the grooves and the sealing strip are of bent design.

14. The sealing arrangement as claimed in claim 1 wherein the bodies are guide blade segments and/or moving blade segments of a gas turbine.

* * * * *